(12) United States Patent
Woodruff

(10) Patent No.: US 7,526,527 B1
(45) Date of Patent: Apr. 28, 2009

(54) STORAGE AREA NETWORK INTERCONNECT SERVER

(75) Inventor: Roger Woodruff, Plymouth, MN (US)

(73) Assignee: Cisco Technology, Inc., San Jose, CA (US)

( * ) Notice: Subject to any disclaimer, the term of this patent is extended or adjusted under 35 U.S.C. 154(b) by 1126 days.

(21) Appl. No.: 10/403,365

(22) Filed: Mar. 31, 2003

(51) Int. Cl.
G06F 15/16 (2006.01)
G06F 15/167 (2006.01)
G06F 15/173 (2006.01)

(52) U.S. Cl. .................. 709/212; 709/217; 709/218; 709/223

(58) Field of Classification Search .......... 709/217–226
See application file for complete search history.

(56) References Cited

U.S. PATENT DOCUMENTS

| 4,495,617 | A | | 1/1985 | Ampulski et al. |
|---|---|---|---|---|
| 5,289,579 | A | | 2/1994 | Punj |
| 5,390,326 | A | | 2/1995 | Shah |
| 5,461,608 | A | | 10/1995 | Yoshiyama |
| 5,473,599 | A | | 12/1995 | Li et al. |
| 5,535,395 | A | | 7/1996 | Tipley et al. |
| 5,544,077 | A | | 8/1996 | Hershey |
| 5,579,491 | A | | 11/1996 | Jeffries et al. |
| 5,600,828 | A | | 2/1997 | Johnson et al. |
| 5,666,486 | A | | 9/1997 | Alfieri et al. |
| 5,684,957 | A | * | 11/1997 | Kondo et al. ............. 726/25 |
| 5,732,206 | A | | 3/1998 | Mendel |
| 5,812,821 | A | | 9/1998 | Sugi et al. |
| 5,862,404 | A | | 1/1999 | Onaga |
| 5,870,571 | A | | 2/1999 | Duburcq et al. |
| 5,909,544 | A | | 6/1999 | Anderson et al. |
| 5,941,972 | A | | 8/1999 | Hoese et al. |
| 5,951,683 | A | | 9/1999 | Yuuki et al. |
| 5,978,478 | A | | 11/1999 | Korematsu |
| 5,991,813 | A | | 11/1999 | Zarrow |
| 5,996,024 | A | | 11/1999 | Blumenau |
| 5,996,027 | A | | 11/1999 | Volk et al. |
| 6,006,224 | A | * | 12/1999 | McComb et al. ............. 707/5 |
| 6,006,259 | A | | 12/1999 | Adelman et al. |
| 6,009,476 | A | | 12/1999 | Flory et al. |
| 6,018,765 | A | | 1/2000 | Durana et al. |
| 6,041,381 | A | | 3/2000 | Hoese |
| 6,078,957 | A | | 6/2000 | Adelman et al. |

(Continued)

OTHER PUBLICATIONS

VMware™ ESX Server: User's Manual, Version 1.0, VMware, Inc., Palo Alto, CA, http://web.archive.org/web/20010608201203/www.vmware.com/support, (Jun. 6, 2001), 122-124.

(Continued)

Primary Examiner—Kenny S Lin
Assistant Examiner—Angela Widhalm
(74) Attorney, Agent, or Firm—Schwegman, Lundberg & Woessner, P.A.

(57) ABSTRACT

Systems and methods for interconnecting a SAN with hosts on a remote network are disclosed. The systems and methods receive a set of device identifiers for a set of physical storage devices on the SAN. The device identifiers are mapped to a set of virtual device identifiers. Virtual devices having the virtual device identifiers are created on the remote network. The virtual devices correspond with the physical devices. Commands and responses are mapped and communicated between the virtual devices and the corresponding physical devices.

17 Claims, 5 Drawing Sheets

U.S. PATENT DOCUMENTS

| | | | |
|---|---|---|---|
| 6,108,300 | A | 8/2000 | Coile et al. |
| 6,108,699 | A | 8/2000 | Moiin |
| 6,131,119 | A | 10/2000 | Fukui |
| 6,134,673 | A | 10/2000 | Chrabaszcz |
| 6,145,019 | A | 11/2000 | Firooz et al. |
| 6,151,684 | A * | 11/2000 | Alexander et al. ............. 714/4 |
| 6,163,855 | A | 12/2000 | Shrivastava et al. |
| 6,178,445 | B1 | 1/2001 | Dawkins et al. |
| 6,185,620 | B1 | 2/2001 | Weber et al. |
| 6,195,687 | B1 | 2/2001 | Greaves et al. |
| 6,195,760 | B1 | 2/2001 | Chung et al. |
| 6,209,023 | B1 | 3/2001 | Dimitroff et al. |
| 6,219,771 | B1 | 4/2001 | Kikuchi et al. |
| 6,260,158 | B1 * | 7/2001 | Purcell et al. ................. 714/10 |
| 6,268,924 | B1 | 7/2001 | Koppolu et al. |
| 6,269,396 | B1 | 7/2001 | Shah et al. |
| 6,286,038 | B1 | 9/2001 | Reichmeyer et al. |
| 6,298,446 | B1 | 10/2001 | Schreiber et al. |
| 6,314,526 | B1 | 11/2001 | Arendt et al. |
| 6,334,154 | B1 | 12/2001 | Gioquindo et al. |
| 6,343,320 | B1 | 1/2002 | Fairchild et al. |
| 6,363,416 | B1 | 3/2002 | Naeimi et al. |
| 6,378,025 | B1 | 4/2002 | Getty |
| 6,393,583 | B1 | 5/2002 | Meth et al. |
| 6,400,730 | B1 | 6/2002 | Latif et al. |
| 6,421,753 | B1 | 7/2002 | Hoese et al. |
| 6,425,035 | B2 | 7/2002 | Hoese et al. |
| 6,425,036 | B2 | 7/2002 | Hoese et al. |
| 6,449,652 | B1 | 9/2002 | Blumenau et al. |
| 6,470,382 | B1 | 10/2002 | Wang et al. |
| 6,470,397 | B1 | 10/2002 | Shah et al. |
| 6,473,803 | B1 | 10/2002 | Stern et al. |
| 6,477,576 | B2 | 11/2002 | Angwin et al. |
| 6,480,901 | B1 | 11/2002 | Weber et al. |
| 6,484,245 | B1 | 11/2002 | Sanada et al. |
| 6,529,963 | B1 | 3/2003 | Fredin et al. |
| 6,553,408 | B1 | 4/2003 | Merrell et al. |
| 6,574,755 | B1 | 6/2003 | Seon |
| 6,591,310 | B1 | 7/2003 | Johnson |
| 6,597,956 | B1 | 7/2003 | Aziz et al. |
| 6,640,278 | B1 * | 10/2003 | Nolan et al. ................... 711/6 |
| 6,654,830 | B1 | 11/2003 | Taylor et al. |
| 6,658,459 | B1 | 12/2003 | Kwan et al. |
| 6,675,196 | B1 | 1/2004 | Kronz |
| 6,678,721 | B1 | 1/2004 | Bell |
| 6,683,883 | B1 | 1/2004 | Czeiger et al. |
| 6,691,244 | B1 | 2/2004 | Kampe et al. |
| 6,697,924 | B2 | 2/2004 | Swank |
| 6,701,449 | B1 | 3/2004 | Davis et al. |
| 6,718,361 | B1 | 4/2004 | Basani et al. |
| 6,721,907 | B2 | 4/2004 | Earl |
| 6,724,757 | B1 | 4/2004 | Zadikian et al. |
| 6,732,170 | B2 * | 5/2004 | Miyake et al. ............. 709/223 |
| 6,738,854 | B2 | 5/2004 | Hoese et al. |
| 6,748,550 | B2 | 6/2004 | McBrearty et al. |
| 6,757,291 | B1 | 6/2004 | Hu |
| 6,760,783 | B1 | 7/2004 | Berry |
| 6,763,195 | B1 | 7/2004 | Willebrand et al. |
| 6,763,419 | B2 | 7/2004 | Hoese et al. |
| 6,771,663 | B1 | 8/2004 | Jha |
| 6,771,673 | B1 | 8/2004 | Baum et al. |
| 6,789,152 | B2 | 9/2004 | Hoese et al. |
| 6,799,316 | B1 | 9/2004 | Aguilar et al. |
| 6,807,581 | B1 | 10/2004 | Starr et al. |
| 6,823,418 | B2 | 11/2004 | Langendorf et al. |
| 6,839,752 | B1 | 1/2005 | Miller et al. |
| 6,845,403 | B2 | 1/2005 | Chadalapaka |
| 6,856,591 | B1 | 2/2005 | Ma et al. |
| 6,859,462 | B1 | 2/2005 | Mahoney et al. |
| 6,877,044 | B2 | 4/2005 | Lo et al. |
| 6,886,171 | B2 | 4/2005 | MacLeod |
| 6,895,461 | B1 | 5/2005 | Thompson |
| 6,898,670 | B2 * | 5/2005 | Nahum ...................... 711/114 |
| 6,920,491 | B2 | 7/2005 | Kim |
| 6,938,092 | B2 | 8/2005 | Burns |
| 6,941,340 | B2 * | 9/2005 | Kim et al. ................... 709/203 |
| 6,941,396 | B1 | 9/2005 | Thorpe et al. |
| 6,944,152 | B1 | 9/2005 | Heil |
| 6,944,785 | B2 | 9/2005 | Gadir et al. |
| 6,976,134 | B1 | 12/2005 | Lolayekar et al. |
| 6,977,927 | B1 * | 12/2005 | Bates et al. .................. 370/381 |
| 7,000,015 | B2 | 2/2006 | Moore et al. |
| 7,020,696 | B1 * | 3/2006 | Perry et al. .................. 709/223 |
| 7,043,727 | B2 | 5/2006 | Bennett et al. |
| 7,089,293 | B2 * | 8/2006 | Grosner et al. .............. 709/217 |
| 7,103,888 | B1 | 9/2006 | Cayton et al. |
| 7,107,395 | B1 * | 9/2006 | Ofek et al. ................... 711/112 |
| 7,120,837 | B1 | 10/2006 | Ferris |
| 7,139,811 | B2 * | 11/2006 | Lev Ran et al. ............. 709/217 |
| 7,165,258 | B1 | 1/2007 | Kuik et al. |
| 7,171,453 | B2 * | 1/2007 | Iwami ......................... 709/218 |
| 7,185,062 | B2 * | 2/2007 | Lolayekar et al. ........... 709/213 |
| 7,197,561 | B1 * | 3/2007 | Lovy et al. ................... 709/224 |
| 7,203,746 | B1 * | 4/2007 | Harrop ......................... 709/224 |
| 7,231,430 | B2 * | 6/2007 | Brownell et al. ............. 709/218 |
| 7,281,062 | B1 | 10/2007 | Kuik et al. |
| 7,370,078 | B1 | 5/2008 | Woodruff |
| 7,437,477 | B2 | 10/2008 | Kuik et al. |
| 2001/0020254 | A1 | 9/2001 | Blumenau et al. |
| 2001/0049740 | A1 | 12/2001 | Karpoff |
| 2002/0010750 | A1 | 1/2002 | Baretzki |
| 2002/0010812 | A1 | 1/2002 | Hoese et al. |
| 2002/0042693 | A1 | 4/2002 | Kampe et al. |
| 2002/0049845 | A1 | 4/2002 | Sreenivasan et al. |
| 2002/0052986 | A1 | 5/2002 | Hoese et al. |
| 2002/0055978 | A1 | 5/2002 | Joon-Bo, et al. |
| 2002/0059392 | A1 | 5/2002 | Ellis |
| 2002/0065864 | A1 * | 5/2002 | Hartsell et al. .............. 709/100 |
| 2002/0065872 | A1 | 5/2002 | Genske et al. |
| 2002/0103889 | A1 * | 8/2002 | Markson et al. ............. 709/223 |
| 2002/0103943 | A1 | 8/2002 | Lo et al. |
| 2002/0116460 | A1 | 8/2002 | Treister et al. |
| 2002/0126680 | A1 | 9/2002 | Inagaki et al. |
| 2002/0156612 | A1 | 10/2002 | Schulter et al. |
| 2002/0161950 | A1 | 10/2002 | Hoese et al. |
| 2002/0176434 | A1 | 11/2002 | Yu et al. |
| 2002/0188657 | A1 | 12/2002 | Traversat et al. |
| 2002/0188711 | A1 | 12/2002 | Meyer et al. |
| 2002/0194428 | A1 | 12/2002 | Green |
| 2003/0005068 | A1 | 1/2003 | Nickel et al. |
| 2003/0014462 | A1 | 1/2003 | Bennett et al. |
| 2003/0014544 | A1 | 1/2003 | Pettey |
| 2003/0018813 | A1 | 1/2003 | Antes et al. |
| 2003/0018927 | A1 | 1/2003 | Gadir, et al. |
| 2003/0058870 | A1 | 3/2003 | Mizrachi et al. |
| 2003/0079014 | A1 * | 4/2003 | Lubbers et al. .............. 709/225 |
| 2003/0084209 | A1 | 5/2003 | Chadalapaka |
| 2003/0093541 | A1 | 5/2003 | Lolayekar et al. |
| 2003/0093567 | A1 | 5/2003 | Lolayekar et al. |
| 2003/0097607 | A1 | 5/2003 | Bessire |
| 2003/0131157 | A1 | 7/2003 | Hoese et al. |
| 2003/0145074 | A1 * | 7/2003 | Penick ......................... 709/223 |
| 2003/0149829 | A1 | 8/2003 | Basham et al. |
| 2003/0163682 | A1 | 8/2003 | Kleinsteiber et al. |
| 2003/0182455 | A1 | 9/2003 | Hetzler et al. |
| 2003/0204580 | A1 * | 10/2003 | Baldwin et al. ............. 709/223 |
| 2003/0208579 | A1 | 11/2003 | Brady et al. |
| 2003/0210686 | A1 | 11/2003 | Terrell et al. |
| 2003/0233427 | A1 | 12/2003 | Taguchi |
| 2003/0236988 | A1 | 12/2003 | Snead |
| 2004/0010545 | A1 * | 1/2004 | Pandya ........................ 709/203 |
| 2004/0022256 | A1 | 2/2004 | Green |
| 2004/0024778 | A1 | 2/2004 | Cheo |
| 2004/0030766 | A1 * | 2/2004 | Witkowski ................... 709/223 |

| | | | |
|---|---|---|---|
| 2004/0064553 | A1 | 4/2004 | Kjellberg |
| 2004/0085893 | A1 | 5/2004 | Wang et al. |
| 2004/0117438 | A1 | 6/2004 | Considine et al. |
| 2004/0141468 | A1 | 7/2004 | Christensen |
| 2004/0148376 | A1 | 7/2004 | Rangan et al. |
| 2004/0233910 | A1 | 11/2004 | Chen et al. |
| 2005/0055418 | A1 | 3/2005 | Blanc et al. |
| 2005/0063313 | A1 | 3/2005 | Nanavati et al. |
| 2005/0268151 | A1 | 12/2005 | Hunt et al. |
| 2007/0112931 | A1 | 5/2007 | Kuik et al. |
| 2007/0299995 | A1 * | 12/2007 | Hoese et al. ............ 710/62 |

OTHER PUBLICATIONS

*Cisco SN 5420 Storage Router Hardware Installation Guide*, Cisco Systems, Inc., San Jose, CA, (2001), 98 pgs.

*Cisco SN 5428 Storage Router Hardware Installation Guide*, Cisco Systems, Inc., San Jose, CA, (2003), 76 pgs.

"High Availability for Cisco SN 5420 Storage Router-Based iSCSI Solutions", *White Papers*, Cisco Systems, Inc., (Jan. 2002), 1-32.

"News Release: Cisco Introduces the Cisco SN 5428 Storage Router", *News@Cisco*, (May 14, 2002), 3 pgs.

"News Release: Cisco SN 5420 Storage Router Delivers iSCSI to Storage Networking", *Cisco Systems*, (Apr. 9, 2001), 3 pgs.

Bakker, G., "IP Aliasing", http://www.zone-h.org/files/24/ip_aliasing.txt, (1999), 3 pgs.

Gusella, R., et al., "An Election Algorithm for a Distributed Clock Synchronization Program", *Report No. UCB/CSD 86/275*, University of California, Berkeley, CA, (Dec. 1985), 1-17.

Gusella, R., et al., "The Berkeley UNIX® Time Synchronization Protocol", *UNIX Programmers Manual 4.3*, vol. 2C, Berkeley Software Distrib., (1986), 10 pgs.

Knight, S., et al., "Virtual Router Redundancy Protocol", Network Working Group, RFC 2338, http://www.search.ietf.org/rfc/rfc2338.txt, (Apr. 1998), 26 pgs.

Lewis, P., "A High-Availability Cluster for Linux", *Linux Journal, 64*, obtained from http://www2.linuxjournal.com/lj-issues/issue64/3247.html, (Apr. 1994), 11 pgs.

Li, T., et al., "Cisco Hot Standby Router Protocol (HSRP)", Network Working Group, RFC 2281, http://www.search.ietf.org/rfc/rfc2281.txt, (1998), 16 pgs.

Meth, K. Z., et al., "Design of the iSCSI protocol", *Proceeding of the 20th IEEE Conference on Mass Storage Systems and Technologies*, (Apr. 7-10, 2003), 116-122.

Moore, K., "On the Use of HTTP as a Substrate", Network Working Group, RFC 3205, http://www.search.ietf.org/rfc/rfc3205.txt,(2002), 14 pgs.

Ross, B., "Storage Over the Internet—iSCSI Emerges", *NetworkWorld Fusion News*, http://www.nwfusion.com/news/tech/2000/1204tech.html1?nf, (Dec. 4, 2000), 5 pgs.

Satran, J., et al., "iSCSI", IPS Internet Draft, draft-ietf-ips-iSCSI-12.txt, Category: standards-track, (Apr. 17, 2002), 260 pgs.

Satran, J., et al., *iSCSI*, IPS Internet Draft, draft-ietf-ips-iSCSI-00, Category: Standards Track, obtained from http://www.haifa.il.ilb.com/satran/ips/draft-ietf-ips-iSCSI-00.txt, (Nov. 2000), 78 pgs.

Simitci, H., et al., "Evaluation of SCSP over TCP/IP and SCSI Over Fibre Channel Connections", *Hot Interconnects, 9*, (Aug. 2001), 87-91.

"Implementing Switch Fabrics in FPGAs", *Altera Corporation*, (2002), 33 pages.

* cited by examiner

STORAGE AREA NETWORK INTERCONNECT SERVER

FIELD

The present invention relates generally to storage area networks, and more particularly to a server for interconnecting a storage area network to a host system.

RELATED FILES

This invention is related to application Ser. No. 10/128,656, filed Apr. 22, 2002, now U.S. Pat. No. 7,165,258 issued Jan. 16, 2007, entitled "SCSI-BASED STORAGE AREA NETWORK", application Ser. No. 10/131,793, filed Apr. 22, 2002, now U.S. Pat. No. 7,281,062, issued Oct. 9, 2007 entitled "VIRTUAL SCSI BUS FOR SCSI-BASED STORAGE AREA NETWORK", provisional application Ser. No. 60/374,921, filed Apr. 22, 2002, entitled "INTERNET PROTOCOL CONNECTED STORAGE AREA NETWORK", application Ser. No. 09/862,648, filed May 22, 2001 entitled "DETERMINING A REMOTE DEVICE NAME" and application Ser. No. 10/356,073, filed Jan. 31, 2003, entitled "STORAGE ROUTER WITH INTEGRATED SCSI SWITCH", all of the above of which are hereby incorporated by reference.

BACKGROUND

The use of Storage Area Networks (SANs) continues to grow. Generally described, a SAN is a specialized network of storage devices that are connected to each other and to a server or cluster of servers that act as an access point to the SAN. SAN's typically use special switches as a mechanism to connect the storage devices. Typically the switches are Fibre Channel based switches.

A SAN provides many advantages to users requiring large amounts of storage. First, a SAN helps to isolate storage activity from a general purpose network. For example, a SAN can be providing data to users on the general purpose network at the same time it is being backed up for archival purposes. The data traffic associated with the backup does not compete for bandwidth on the general purpose network, it typically stays on the specialized network.

An additional advantage is that a SAN can be reconfigured, i.e. storage can be added or removed, without disturbing hosts on the general purpose network.

Recently the iSCSI protocol has provided a means for computers on a TCP/IP based network to take advantage of SAN technology without the need for purchasing and installing expensive Fibre Channel interfaces and software for each host desiring access to the SAN. The iSCSI protocol has provided increased flexibility in the location of SANs with respect to the hosts that accesses the SAN, because the SAN and the host need only have a TCP/IP based network in order to communicate.

Unfortunately, this same flexibility is not available to hosts on a Fibre Channel based network. In order for a Fibre Channel based host to access a SAN, the SAN must be typically collocated on the same network as the host, resulting in less flexibility in locating storage resources.

In view of the above, there is a need in the art for the present invention.

SUMMARY

The above-mentioned shortcomings, disadvantages and problems are addressed by the present invention, which will be understood by reading and studying the following specification.

Systems and methods interconnect a SAN with hosts on a remote network. The systems and methods receive a set of device identifiers for a set of physical storage devices on the SAN. The device identifiers are mapped to a set of virtual device identifiers. Virtual devices having the virtual device identifiers are created on the remote network. The virtual devices correspond with the physical devices. Commands and responses are mapped and communicated between the virtual devices and the corresponding physical devices.

The present invention describes systems, methods, and computer-readable media of varying scope. In addition to the aspects and advantages of the present invention described in this summary, further aspects and advantages of the invention will become apparent by reference to the drawings and by reading the detailed description that follows.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the scope of the present invention.

Some portions of the detailed descriptions that follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

In the Figures, the same reference number is used throughout to refer to an identical component which appears in multiple Figures. Signals and connections may be referred to by the same reference number or label, and the actual meaning will be clear from its use in the context of the description.

The following detailed description is, therefore, not to be taken in a limiting sense, and the scope of the present invention is defined only by the appended claims.

Operating Environment

Figure 1:
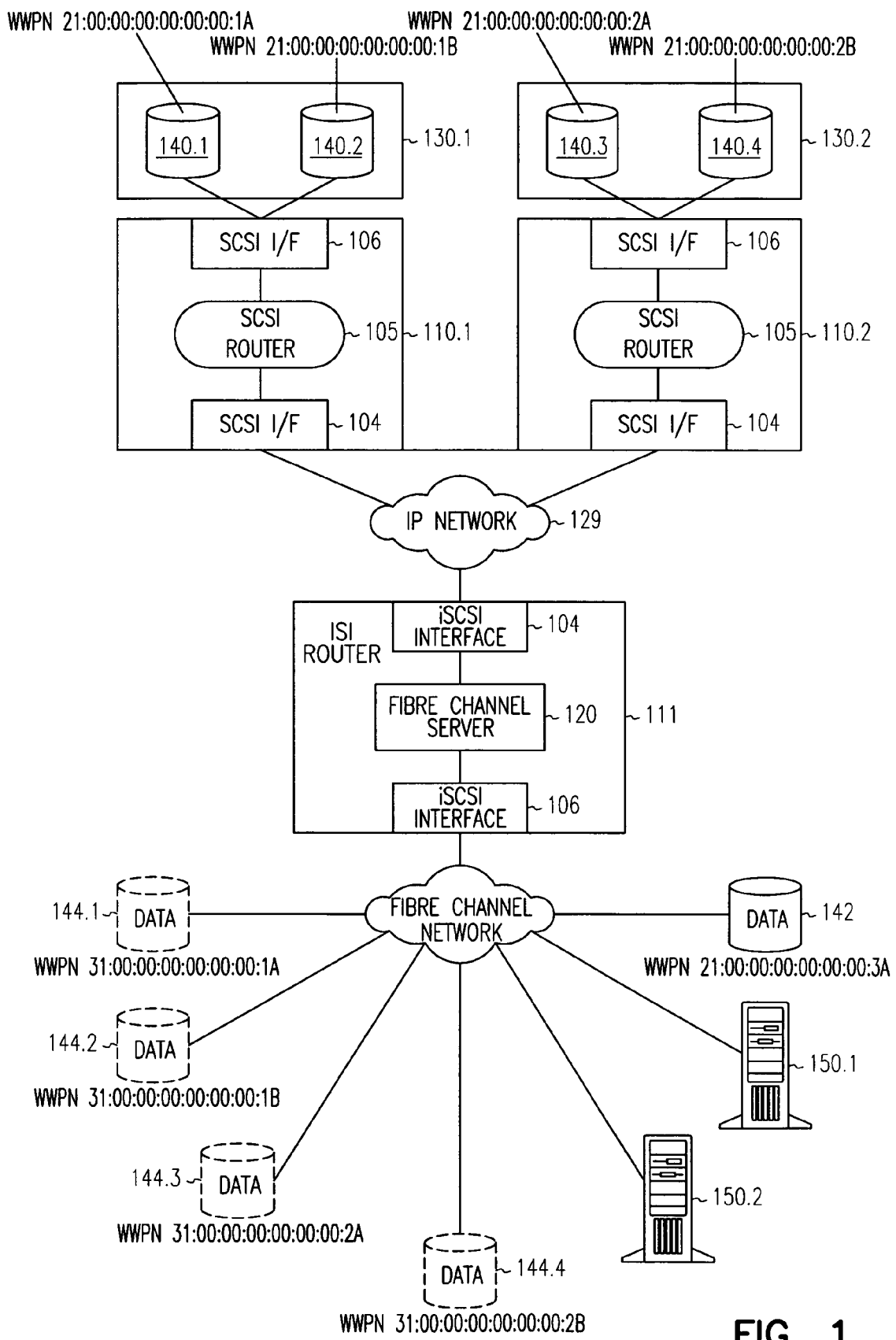
FIG. 1 is a block diagram of a hardware and operating environment in which different embodiments of the invention can be practiced.

Some embodiments of the invention operate in an environment of systems and methods that provide a means for Fibre Channel based Storage Area Networks (SANs) to be accessed from a host on a remote network. FIG. 1 is a block diagram describing the major components of such an environment. In some embodiments of the invention, a SAN interconnect environment 100 includes one or more storage routers 110 connected through storage network 130 to one or more SCSI devices 140. In the exemplary embodiment shown in FIG. 1, two storage routers 110.1 and 110.2 on two storage networks 130.1 and 130.2 are shown. However, the invention is not limited to any particular number of storage routers or storage area networks.

Each storage router 110 includes an iSCSI interface 104, one or more SCSI routers 105 and a SCSI interface 106. iSCSI interface 104 receives encapsulated SCSI packets to and from IP network 129, extracts the SCSI packet and send the SCSI packet to SCSI router 105. SCSI router 105 determines the appropriate target, and sends the SCSI packet to SCSI interface 106. SCSI interface 106 modifies the SCSI packet to conform to its network protocol (e.g., Fibre Channel, parallel SCSI, or iSCSI) and places the modified SCSI packet onto storage network 130. The SCSI packet is then delivered to its designated SCSI device 140. Conversely, SCSI data received from storage network 130 by SCSI interface 106 is sent to SCSI router 105, which then determines an appropriate destination and sends the SCSI packet to iSCSI interface 104 for encapsulation in a TCP/IP packet.

In one embodiment, storage router 110 provides IPv4 router functionality between a Gigabit Ethernet and a Fibre Channel interface. In one such embodiment, static routes are supported. In addition, storage router 110 supports a configurable MTU size for each interface, and has the ability to reassemble and refragment IP packets based on the MTU of the destination interface.

In one embodiment, storage router 110 acts as a gateway, converting SCSI protocol between Fibre Channel and TCP/IP. Storage router 110 is configured in such an embodiment to present Fibre Channel devices as iSCSI targets, providing the ability for clients on the IP network to directly access storage devices.

In one embodiment, SCSI routing occurs in the Storage Router 110 through the mapping of physical storage devices to iSCSI targets. An iSCSI target (also called a logical target) is an arbitrary name for a group of physical storage devices. Mappings between an iSCSI target to multiple physical devices can be established using configuration programs on storage router 110. An iSCSI target always contains at least one Logical Unit Number (LUN). Each LUN on an iSCSI target is mapped to a single LUN on a physical storage target.

Environment 100 also includes an iSCSI SAN interconnect router 111, also referred to as ISI router 111 communicably coupled to one or more storage routers 110 through IP network 129. ISI router 111 is also communicably coupled one or more Fibre Channel hosts 150 through Fibre Channel network 160. Fibre Channel network 160 may also include one or more physical storage devices 142.

ISI router 111, like storage router 110 includes an iSCSI interface 104 and SCSI interface 106. In some embodiments, SCSI interface 106 is a Fibre Channel interface connected to a Fibre Channel network 160. In some embodiments, ISI router 111 includes a Fibre Channel server 120. Fibre Channel server 120 is typically configured with the address of each storage router 110. Fibre Channel server 120 learns the SCSI devices 140 coupled through storage network 130 to each configured storage router 110, and presents these devices as if they were present on Fibre Channel network 160. Thus, Fibre Channel server 111 maintains a set of one or more virtual storage devices 144 for Fibre Channel network 160, each virtual storage device 144 corresponding to a physical SCSI device 140. Fibre Channel hosts 150 can access the virtual storage devices 144 as if they were physically present on network 160. The ISI router 111 effectively serves as a bridge between the hosts on Fibre Channel network 160 and the devices on storage area network 130, using the iSCSI protocol to communicate between the ISI router 111 and storage routers 110. Further details on the operation of the system are described below in the methods section.

Figure 2:
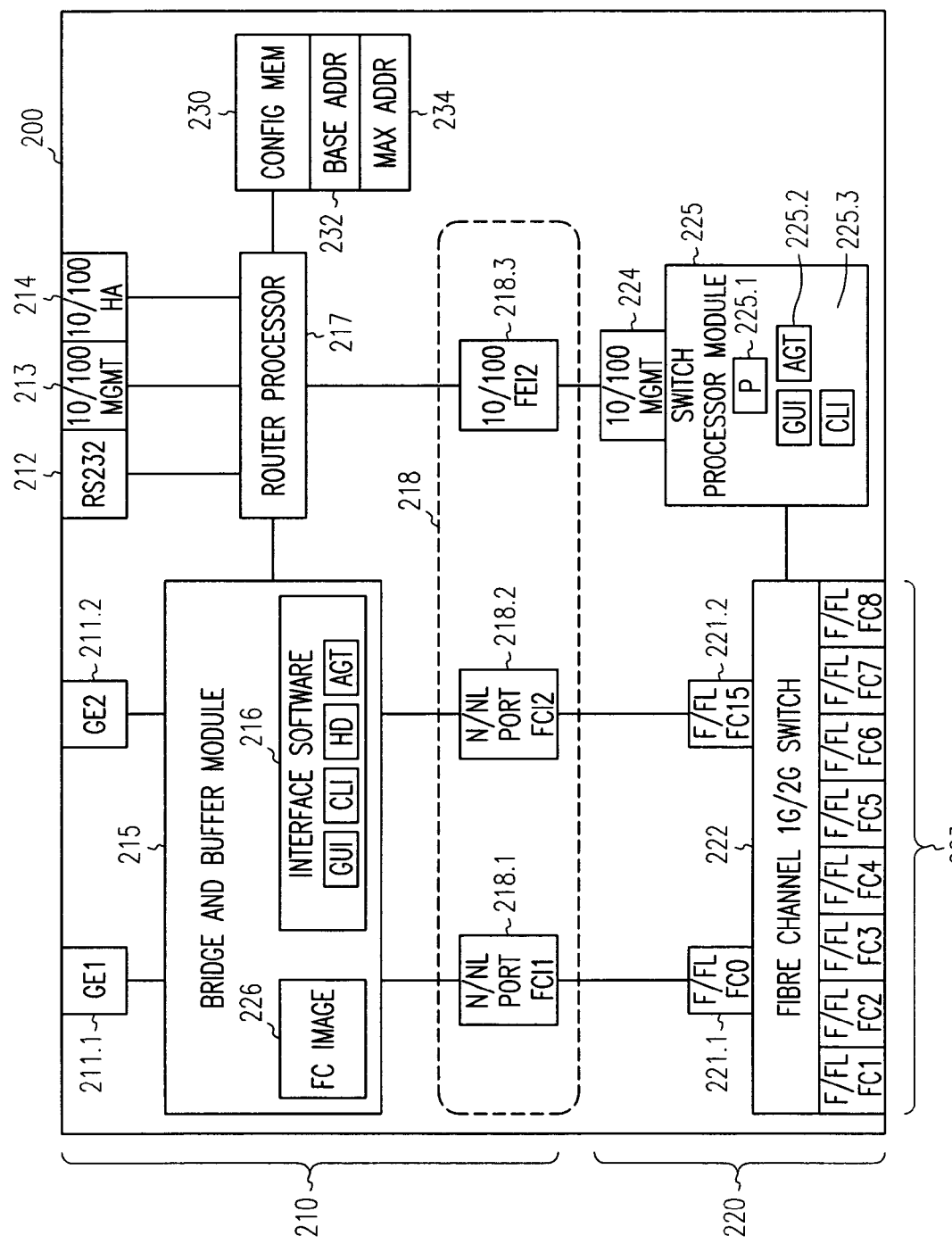
FIG. 2 is a block diagram of the major hardware components of a iSCSI Interconnect router according to an embodiment of the invention.

FIG. 2 is a block diagram providing further details of the major hardware components comprising storage router 110 and ISI router 111. In some embodiments, a storage router 110 or ISI router 111 includes a router portion 210 and a switch portion 220 on a common motherboard 200. The motherboard is powered by a power supply (not shown) and cooled by common cooling system, such as a fan (also not shown).

Router portion 210, which in the exemplary embodiment complies with draft 08 and later versions of the iSCSI protocol and incorporates commercially available router technology, such as the 5420 and 5428 Storage Routers from Cisco Systems, Inc. of San Jose, Calif., includes Gigabit Ethernet (GE) ports 211.1 and 211.2, console port 212, management port 213, high-availability (HA) port 214, bridge-and-buffer module 215, interface software 216, router processor 217, and router-to-switch interface 218.

GE ports 211.1 and 211.2 couple the storage router to an IP network for access by one or more servers or other computers, such as servers or iSCSI hosts (in FIG. 1). In some embodiments, GE ports 211.1 and 211.2 have respective MAC addresses, which are determined according to a base MAC address for the storage router plus 31 minus the respective port number. Two or more Gigabit Ethernet interfaces may be available. In some embodiments, one or more of the Gigabit Ethernet interfaces may provide internal support for maintaining Virtual Local Area Networks (VLANs). Each SCSI router typically supports a single IP address. The SCSI router IP address may be tied to any network (or VLAN) on either GE interface. Generally at least one SCSI router instance is created for each GE interface.

Console port 212 couples to a local control console (not shown). In the exemplary embodiment, this port takes the form of an RS-232 interface.

Management port 213 provides a connection for managing and/or configuring storage router 110. In the exemplary embodiment, this port takes the form of a 10/100 Ethernet port and may be assigned the base MAC address for the router-switch.

HA port 214 provides a physical connection for high-availability communication with another router-switch, such as storage router 110 in FIG. 1. In the exemplary embodiment, this port takes the form of a 10/100 Ethernet port, and is assigned the base MAC address plus 1.

Bridge-and-buffer module 215, which is coupled to GE ports 211.1 and 211.2, provides router services that are compliant with draft 08 and later versions of the iSCSI protocol. In the exemplary embodiment, module 215 incorporates a Peripheral Component Interface (PCI) bridge, such as the GT64260 from Marvell Technology Group, LTD. of Sunnyvale, Calif. Also module 215 includes a 64-megabyte flash file system, a 1-megabyte boot flash, and a 256-megabyte non-volatile FLASH memory (not shown separately.) Configuration memory 230 may be part of the flash file system, the boot flash or the non-volatile flash memory, or it may be a separate non-volatile flash memory. In addition, in alternative embodiments, configuration memory 230 may be part of a hard disk, CD-ROM, DVD-ROM or other persistent memory (not shown). The invention is not limited to any particular type of memory for configuration memory 230.

In addition to data and other software used for conventional router operations, module 215 includes router-switch interface software 216. Router-switch software 216 performs iSCSI routing between servers and the storage devices. The software includes an integrated router-switch command line interface module CLI and a web-based graphical-user-interface module (GUI) for operation, configuration and administration, maintenance, and support of the router-switch 110. Both the command-line interface and the graphical user interface are accessible from a terminal via one or both of the ports 213 and 214. Additionally, to facilitate management activities, interface software 216 includes an SNMP router-management agent AGT and an MIB router handler HD. (SNMP denotes the Simple Network Management Protocol, and MIB denotes Management Information Base (MIB)). The agent and handler cooperate with counterparts in switch portion 220 (as detailed below) to provide integrated management and control of router and switching functions in router-switch 200.

Router Processor 217, in the exemplary embodiment, is implemented as a 533-MHz MPC7410 PowerPC from Motorola, Inc. of Schaumburg, Ill. This processor includes 1-megabyte local L2 cache (not shown separately). In the exemplary embodiment, router processor 217 runs a version of the VX Works operating system from WindRiver Systems, Inc. of Alameda, Calif. To support this operating system, the exemplary embodiment also provides means for isolating file allocations tables from other high-use memory areas (such as areas where log and configuration files are written).

Coupled to router processor 217 as well as to bridge-and-buffer module 215 is router-to-switch (RTS) interface 218. RTS interface 218 includes N/NL switch-interface ports 218.1 and 218.2 and management-interface port 218.3, where the port type of N or NL is determined by negotiation. N type ports may act as a Fibre Channel point to point port, NL type ports may negotiate as a loop.

Switch-interface ports 218.1 and 218.2 are internal Fibre Channel (FC) interfaces through which the router portion conducts I/O operations with the switch portion. When a mapping to a FC storage device is created, the router-switch software automatically selects one of the switch-interface ports to use when accessing the target device. The internal interfaces are selected at random and evenly on a per-LUN (logical unit number) basis, allowing the router-switch to load-balance between the two FC interfaces. The operational status of these internal FC interfaces is monitored by each active SCSI Router application running on the switch-router. The failure of either of these two interfaces is considered a unit failure, and if the switch-router is part of a cluster, all active SCSI Router applications will fail over to another switch-router in the cluster. Other embodiments allow operations to continue with the remaining switch-interface port. Still other embodiments include more than two switch-interface ports.

In the exemplary embodiment, the N/NL switch-interface ports can each use up to 32 World Wide Port Names (WWPNs). The WWPNs for port 218.1 are computed as 28+virtual port+base MAC address, and the WWPNs for port 218.2 are computed as 29+virtual port+base MAC address. Additionally, switch-interface ports 218.1 and 218.2 are hidden from the user. One exception is the WWPN of each internal port. The internal WWPNs are called "initiator" WWPNs. Users who set up access control by WWPN on their FC devices set up the device to allow access to both initiator WWPNs.

Switch-interface port 218.3 is used to exchange configuration data and get operational information from switch portion 220 through its management-interface port 224. In the exemplary embodiment, switch-interface port 218.3 is an 10/100 Ethernet port. In the exemplary embodiment, this exchange occurs under the control of a Switch Management Language (SML) Application Program Interface (API) that is part of interface software 216. One example of a suitable API is available from QLogic Corporation of Aliso Viejo, Calif. Ports 218.1, 218.2, and 218.3 are coupled respectively to FC interface ports 221.1 and 221.2 and interface port 224 of switch portion 220.

Switch portion 220, which in the exemplary embodiment incorporates commercially available technology and supports multiple protocols including IP and SCSI, additionally includes internal FC interface ports 221.1 and 221.2, an FC switch 222, external FC ports (or interfaces) 223.1-223.8, a management interface port 224, and a switch processor module 225.

FC interface ports 221.1 221.2 are coupled respectively to ports of 218.1 and 218.2 of the router-to-switch interface via internal optical fiber links, thereby forming internal FC links. In the exemplary embodiment, each FC interface supports auto-negotiation as either an F or FL port.

FC switch 222, in the exemplary embodiment, incorporates a SANbox2-16 FC switch from QLogic Corporation. This SANbox2 switch includes QLogic's Itasca switch ASIC (application-specific integrated circuit.) Among other things, this switch supports Extended Link Service (ELS) frames that contain manufacturer information.

FC ports 223.1-223.8, which adhere to one or more FC standards or other desirable communications protocols, can be connected as point-to-point links, in a loop or to a switch. For flow control, the exemplary embodiment implements a Fibre Channel standard that uses a look-ahead, sliding-window scheme, which provides a guaranteed delivery capability. In this scheme, the ports output data in frames that are limited to 2148 bytes in length, with each frame having a header and a checksum. A set of related frames for one operation is called a sequence.

Moreover, the FC ports are auto-discovering and self-configuring and provide 2-Gbps full-duplex, auto-detection for compatibility with 1-Gbps devices. For each external FC port, the exemplary embodiment also supports: Arbitrated Loop (AL) Fairness; Interface enable/disable; Linkspeed settable to 1 Gbps, 2 Gbps, or Auto; Multi-Frame Sequence bundling; Private (Translated) Loop mode.

Switch processor module 225 operates the FC switch and includes a switch processor (or controller) 225.1, and associated memory that includes a switch management agent 225.2, and a switch MIB handler 225.3. In the exemplary embodiment, switch processor 225.1 includes an Intel Pentium processor and a Linux operating system. Additionally, processor 225 has its own software image, initialization process, configuration commands, command-line interface, and graphical user interface (not shown). (In the exemplary embodiment, this command-line interface and graphical-user interface are not exposed to the end user.) A copy of the switch software image for the switch portion is maintained as a tar file 226 in bridge-and-buffer module 215 of router portion 210.

Further details on the operation of the above describe system, including high availability embodiments can be found in application Ser. No. 10/128,656, entitled "SCSI-BASED STORAGE AREA NETWORK", application Ser. No. 10/131,793, entitled "VIRTUAL SCSI BUS FOR SCSI-BASED STORAGE AREA NETWORK", and provisional application Ser. No. 60/374,921, entitled "INTERNET PROTOCOL CONNECTED STORAGE AREA NETWORK", all of which have been previously incorporated by reference.

SAN Interconnection Method

FIGS. 3A-3E are flowcharts illustrating methods according to embodiments of the invention for interconnecting a SAN with hosts on a remote network. The method to be performed by the operating environment constitutes computer programs made up of computer-executable instructions. Describing the methods by reference to a flowchart enables one skilled in the art to develop such programs including such instructions to carry out the methods on suitable computers (the processor or processors of the computer executing the instructions from computer-readable media). The methods illustrated in FIGS. 3A-3E are inclusive of acts that may be taken by an operating environment executing an exemplary embodiment of the invention.

The method begins when a system such as ISI router 111 receives a set of device identifiers representing physical storage devices on a SAN (block 305). In some embodiments, the device identifiers comprise a set of SCSI World Wide Port Names (WWPNs). In some embodiments, these device identifiers will be received in response to a discovery request issued to a storage router connected to the SAN. In some embodiments, the system must login to the storage router using ISCSI login procedures prior to issuing the request. In some embodiments, the login process and device discovery takes place as described in U.S. patent application Ser. No. 09/862,648 entitled "Determining a Remote Device Name" which has been previously incorporated by reference.

Next, the system maps the WWPNs for the physical devices to a corresponding set of WWPNs for virtual devices (block 310). Typically the NAA (Network Address Authority) value of the WWPN for the physical device will be 2, indicating a globally unique WWPN. In some embodiments, the mapping step comprises creating a WWPN for the virtual device by changing the NAA to a value of 3, indicating that the WWPN is a locally assigned address. In alternative embodiments of the invention, a WWPN for the virtual device may be constructed using the MAC address of the ISI router system and an NAA value of 3.

In some embodiments, a World Wide Node Name (WWNN) for the virtual devices is formed comprising the MAC address of the ISI router with a NAA value of 1.

Next, the system presents a set of virtual devices with their corresponding WWPNs on a second network, i.e. a remote network from the SAN (block 315). The virtual devices appear to hosts on the second network as if they were physically present on the second network. The ISI router system responds to commands issued by hosts on the second network for the virtual devices on behalf of the physical devices. Upon receiving such a command (block 320), the system determines the physical device corresponding to the virtual device (block 325) and sends the command to the physical device (block 330). The system maintains data associating the command with the host that issued the command so that it may send any responses to the command to the correct host.

Upon receiving a response from a physical device (block 335), the system determines the corresponding virtual device (block 340), and then determines which host issued the command to that virtual device. The response is then sent to the host (block 345).

Figure 3A:
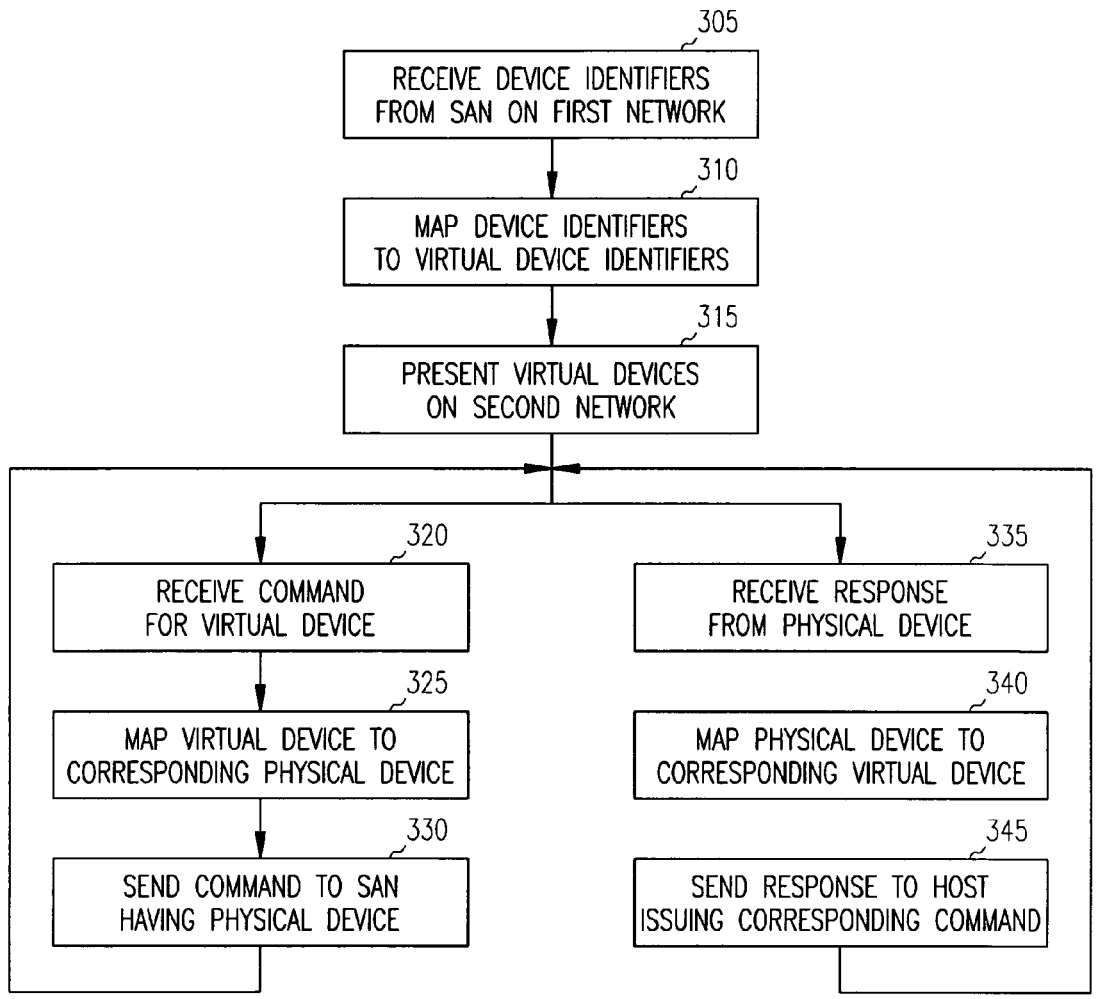
FIGS. 3A-3E are flowcharts illustrating methods of interconnecting a SAN to a host according to embodiments of the invention.
Figure 3B:
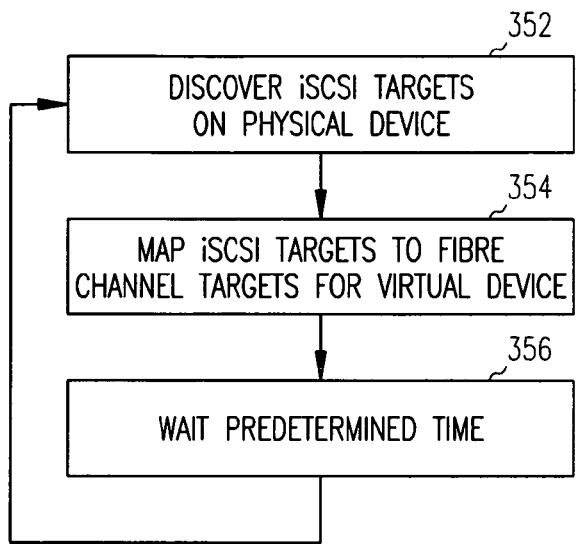

FIG. 3B illustrates a method according to an embodiment of the invention for updating virtual device information. The method begins by discovering iSCSI targets on physical devices on a SAN (block 352). This may result in the discovery of new targets, or the elimination of target as the SAN is reconfigured or as devices on the SAN power up or down. The current set of targets is then mapped to corresponding Fibre Channel targets on the virtual devices presented by the system (block 354). The system then waits for a predetermined time (block 356) and returns to block 352 to rediscover targets. In some embodiments of the invention, the predetermined time is sixty seconds, however the invention is not limited to any particular time period. By rediscovering periodically, some embodiments of the invention avoid presenting stale targets for the virtual devices.

Figure 3C:
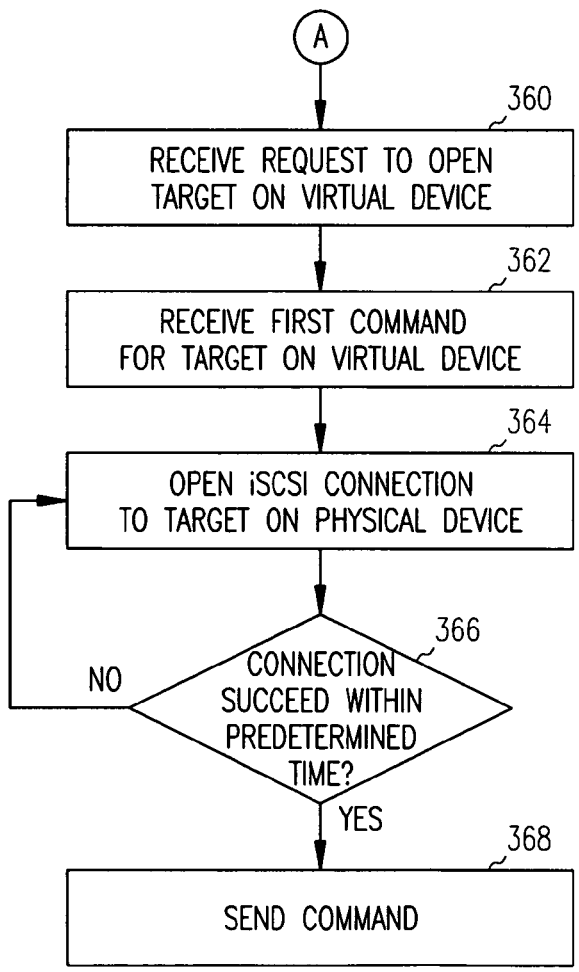

FIG. 3C illustrated a method according to an embodiment of the invention for processing the opening of a target on a virtual device. The method begins by receiving a request to open a target on a virtual device from a host on the same network as the virtual device (block 360). In some embodiments, the system does not immediately establish an iSCSI connection to a target on the corresponding physical device, but rather waits until a command is received for the target on the virtual device (block 362). The system then attempts to open a connection to the target on the physical device (block 364). If the iSCSI connection attempt is successful, the command is sent to the physical target through the iSCSI connection (block 366). A successful connection attempt in some embodiments is one in which a TCP connection can be established and a successful iSCSI login completed.

Otherwise, if the connection cannot be established within a predetermined time, the system returns to block 364 to attempt another connection. By waiting until a command is actually received, the system conserves iSCSI connections and does not open one until it is actually needed. Additionally, in some embodiments, there is one iSCSI connection per remote host/target combination. This has the effect in some embodiments of preserving the host identity through the ISI router.

Figure 3D:
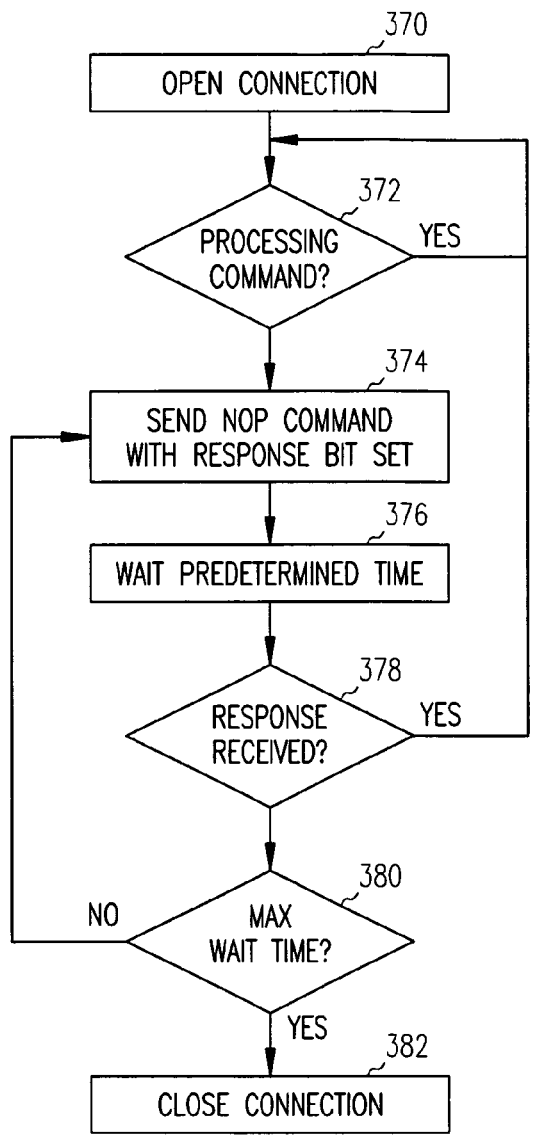

FIG. 3D illustrates a method for maintaining a connection once it has been opened. The method begins by opening an iSCSI connection for a virtual device to physical device data flow (block 370). After the connection is established, the system checks to see if there is command being processed through the connection (block 372). If a command is outstanding, the system returns to wait a predetermined time before checking again.

If a command is not currently begin processed through the connection, the system sends a "no operation" command to the target. In one embodiment, an iSCSI NOP (no operation) command may be sent to the target on the physical device associated with connection (block 374). In some embodiments, the response bit is set in the command to indicate that the device should respond. The system then waits for a predetermined time to receive a response to the NOP command (block 376). In some embodiments of the invention, the system waits up to sixty seconds for a response. If a response is received (block 378), the system returns to block 372 and rechecks again at a later time.

If no response is received (block 378), then a check is made to determine if a maximum waiting time has been reached (block 380). In some embodiments, the maximum waiting time is measured from when the first NOP command is sent after detecting that no commands are outstanding. If the maximum wait time has not yet been reached, the system returns to block 374 and resends a NOP command to the target on the physical device. Otherwise, if the maximum wait time has been reached, the system closes the connection (block 382). In some embodiments of the invention, the maximum waiting time is 180 seconds. However the invention is not limited to any particular value for the maximum waiting time. The method illustrated in FIG. 3D allows the system of some embodiments of the invention to prune dead connections faster than would otherwise be available utilizing standard network timeouts.

Figure 3E:
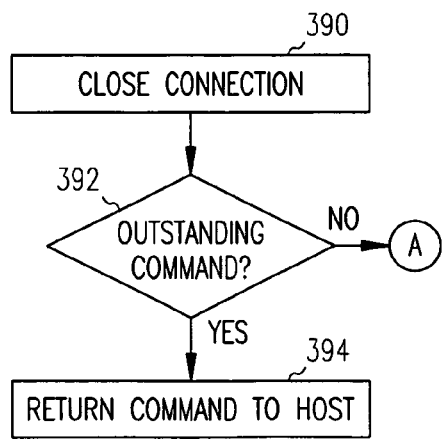

FIG. 3E illustrates a method for closing a connection in accordance with an embodiment of the invention. The method begins when an iSCSI connection is closed on the system (block 390). The closure may be related to any one of a number reasons. For example, the network connection between an ISI router and a storage router may be dropped due to network failure, a physical device may have powered down, a storage router or SAN may have powered down. The invention is not limited to any particular reason for connection closure.

After the iSCSI connection has closed, the system checks to determine if any commands were outstanding on the closed connection (block 392). If not, the system may proceed to block 360 (FIG. 3C) to await a new command to cause a new iSCSI connection to be opened. The host using the target on the virtual device will typically not even notice that the connection was closed. Additionally, there is no need for the host to perform a Fibre Channel login for the target on the virtual device.

Otherwise, if a command was outstanding, the system returns the command to the host issuing the command (block 394). In some embodiments, the command is returned with a unit check and sense record to indicate that the command should be retried.

This section has described the various software methods in a system that interconnects a SAN with hosts on a remote network. As those of skill in the art will appreciate, the software can be written in any of a number of programming languages known in the art, including but not limited to C/C++, Visual Basic, Smalltalk, Pascal, Ada and similar programming languages. The invention is not limited to any particular programming language for implementation.

CONCLUSION

Systems and methods for interconnecting a SAN with hosts on a remote network are described. The systems and methods form a bridge from hosts on a remote network to storage devices on a SAN. Although specific embodiments have been illustrated and described herein, it will be appreciated by those of ordinary skill in the art that any arrangement that is calculated to achieve the same purpose may be substituted for the specific embodiments shown. For example, the present invention has been described in the context of a storage router network device. The systems and methods of the invention apply equally as well to other types of network devices having a plurality of internal and external network interfaces. This application is intended to cover any adaptations or variations of the present invention.

The terminology used in this application is meant to include all of these environments. It is to be understood that the above description is intended to be illustrative, and not restrictive. Many other embodiments will be apparent to those of skill in the art upon reviewing the above description. Therefore, it is manifestly intended that this invention be limited only by the following claims and equivalents thereof.

What is claimed is:

1. A method for providing access to a storage area network, the method comprising:
    accessing a storage router connected to a set of physical storage devices on the storage area network, the storage router including a plurality of SCSI routers assigned a plurality of IP addresses;
    issuing a discovery request to the storage router to determine the presence of the set of physical devices on the storage area network;
    receiving a set of device identifiers for the set of physical storage devices on an iSCSI interconnect router;
    mapping the set of identifiers to a set of virtual device identifiers;
    presenting to a host on a second network a set of virtual storage devices corresponding to the set of physical storage devices and identified by the set of virtual device identifiers;
    waiting a predetermined period of time to determine if changes in the set of physical devices exist;
    updating the set of virtual storage devices in accordance with the changes.

2. The method of claim 1, wherein the predetermined time is sixty seconds.

3. The method of claim 1, wherein determining if changes exist includes determining changes in iSCSI targets on the physical devices.

4. A method for interconnecting a storage device on a storage area network to a host on a remote network, the method comprising:
    accessing a storage router connected to a set of physical storage devices on the storage area network, the storage router including a plurality of SCSI routers assigned a plurality of IP addresses;
    receiving from the host a request to open a target on a virtual device presented on the remote network, said virtual device corresponding to a physical device on the storage area network and coupled to the storage router;
    receiving a command from the host for the target on the virtual device;

opening an iSCSI connection to a target on the physical device coupled to the storage router using one of the plurality of SCSI routers;

if the connection succeeds, then issuing the command to the target on the physical device, otherwise waiting a predetermined time and repeating the attempt to open an iSCSI connection to the target on the physical device.

5. A method for maintaining a connection between a physical storage device on a storage area network and a virtual storage device presented on a remote network, the method comprising:

accessing a storage router connected to a set of physical storage devices on the storage area network, the storage router including a plurality of SCSI routers assigned a plurality of IP addresses, wherein at least one of the plurality of SCSI routers manages one or more iSCSI connections to one or more targets on the physical storage device;

mapping a virtual storage device to a physical storage device on a storage area network connected to the storage router through one of the plurality of SCSI routers;

determining if a command is currently being processed by the physical storage device;

if no command is currently being processed, then:
sending a no-op command to the physical storage device,
waiting up to a predetermined time to determine if a response is received from the physical storage device, and
if no response is received, then determining if a maximum waiting time has elapsed and if so closing the connection.

6. The method of claim 5, wherein the predetermined time is sixty seconds.

7. The method of claim 5, wherein the maximum waiting time is 180 seconds.

8. The method of claim 5, wherein the command is a SCSI command.

9. A tangible computer-readable storage medium having stored thereon computer executable instructions for performing a method for providing access to a storage area network, the method comprising:

accessing a storage router connected to a set of physical storage devices on the storage area network, the storage router including a plurality of SCSI routers assigned a plurality of IP addresses;

issuing a discovery request to the storage router to determine the presence of the set of physical devices on the storage area network;

receiving a set of device identifiers for the set of physical storage devices on an iSCSI interconnect router;

mapping the set of identifiers to a set of virtual device identifiers;

presenting to a host on a second network a set of virtual storage devices corresponding to the set of physical storage devices and identified by the set of virtual device identifiers;

waiting a predetermined period of time to determine if changes in the set of physical devices exist;

updating the set of virtual storage devices in accordance with the changes.

10. The tangible computer-readable storage medium of claim 9, wherein the predetermined time is sixty seconds.

11. The tangible computer-readable storage medium of claim 9, wherein determining if changes exist includes determining changes in iSCSI targets on the physical devices.

12. A tangible computer-readable storage medium having stored thereon computer executable instructions for performing a method for interconnecting a storage device on a storage area network to a host on a remote network, the method comprising:

accessing a storage router connected to a set of physical storage devices on the storage area network, the storage router including a plurality of SCSI routers assigned a plurality of IP addresses;

receiving from the host a request to open a target on a virtual device presented on the remote network, said virtual device corresponding to a physical device on the storage area network and coupled to the storage router;

receiving a command from the host for the target on the virtual device;

opening an iSCSI connection to a target on the physical device coupled to the storage router using one of the plurality of SCSI routers;

if the connection succeeds, then issuing the command to the target on the physical device, otherwise waiting a predetermined time and repeating the attempt to open an iSCSI connection to the target on the physical device.

13. A tangible computer-readable storage medium having stored thereon computer executable instructions for performing a method for maintaining a connection between a physical storage device on a storage area network and a virtual storage device presented on a remote network, the method comprising:

accessing a storage router connected to a set of physical storage devices on the storage area network, the storage router including a plurality of SCSI routers assigned a plurality of IP addresses, wherein at least one of the plurality of SCSI routers manages one or more iSCSI connections to one or more targets on the physical storage device;

mapping a virtual storage device to a physical storage device on a storage area network connected to the storage router through one of the plurality of SCSI routers;

determining if a command is currently being processed by the physical storage device;

if no command is currently being processed, then:
sending a no-op command to the physical storage device,
waiting up to a predetermined time to determine if a response is received from the physical storage device, and
if no response is received, then determining if a maximum waiting time has elapsed and if so closing the connection.

14. The tangible computer-readable storage medium of claim 13, wherein the predetermined time is sixty seconds.

15. The tangible computer-readable storage medium of claim 13, wherein the maximum waiting time is 180 seconds.

16. The tangible computer-readable storage medium of claim 13, wherein the command is a SCSI command.

17. A computerized system comprising:

means for accessing a storage router connected to a set of physical storage devices on the storage area network, the storage router including a plurality of SCSI routers assigned a plurality of IP addresses;

means for issuing a discovery request to the storage router to determine the presence of the set of physical devices on the storage area network;

means for receiving a set of device identifiers for the set of physical storage devices on an iSCSI interconnect router;

means for mapping the set of identifiers to a set of virtual device identifiers;

means for presenting to a host on a second network a set of virtual storage devices corresponding to the set of physical storage devices and identified by the set of virtual device identifiers;

waiting a predetermined period of time to determine if changes in the set of physical devices exist;

means for updating the set of virtual storage devices in accordance with the changes.

* * * * *